US007897219B2

(12) United States Patent
Wehrmann

(10) Patent No.: US 7,897,219 B2
(45) Date of Patent: Mar. 1, 2011

(54) WEB AND METHOD FOR MAKING FLUID FILLED UNITS

(75) Inventor: Rick Steven Wehrmann, Hudson, OH (US)

(73) Assignee: Automated Packaging Systems, Inc., Streetsboro, OH (US)

( * ) Notice: Subject to any disclaimer, the term of this patent is extended or adjusted under 35 U.S.C. 154(b) by 454 days.

(21) Appl. No.: 11/299,933

(22) Filed: Dec. 12, 2005

(65) Prior Publication Data

US 2006/0086064 A1 Apr. 27, 2006

(51) Int. Cl.
*B32B 1/02* (2006.01)
*B32B 1/04* (2006.01)
*B32B 1/06* (2006.01)

(52) U.S. Cl. ...................... 428/35.2; 428/34.1; 428/35.7; 428/35.9; 428/36.3; 428/36.9

(58) Field of Classification Search ................. 428/34.1, 428/35.2, 35.7, 35.9, 36.3, 36.9
See application file for complete search history.

(56) References Cited

U.S. PATENT DOCUMENTS

| | | | | |
|---|---|---|---|---|
| 3,033,257 | A | 5/1962 | Weber | |
| 3,254,820 | A | 6/1966 | Lerner | |
| 3,254,828 | A | 6/1966 | Lerner | |
| 3,298,156 | A | 1/1967 | Lerner | |
| 3,358,823 | A * | 12/1967 | Paxton | 206/390 |
| 3,359,703 | A | 12/1967 | Quaadgras | |
| 3,389,534 | A | 6/1968 | Pendleton | |
| 3,462,027 | A | 8/1969 | Puckhaber | |
| 3,477,196 | A | 11/1969 | Lerner | |
| 3,523,055 | A | 8/1970 | Lemelson | |
| 3,575,757 | A | 4/1971 | Smith | |
| 3,575,781 | A | 4/1971 | Pezely | |
| 3,577,305 | A | 5/1971 | Hines et al. | |
| 3,616,155 | A | 10/1971 | Chavannes | |
| 3,618,286 | A | 11/1971 | Membrino | |
| 3,650,877 | A | 3/1972 | Johnson | |
| 3,660,189 | A | 5/1972 | Troy | |
| 3,667,593 | A | 6/1972 | Pendleton | |
| 3,730,240 | A | 5/1973 | Presnick | |
| 3,744,211 | A | 7/1973 | Titchenal et al. | |
| 3,791,573 | A | 2/1974 | Titchenal et al. | |
| 3,795,163 | A | 3/1974 | Armstrong et al. | |
| 3,802,974 | A | 4/1974 | Emmel | 156/55 |

(Continued)

FOREIGN PATENT DOCUMENTS

CA 2428246 9/2002

(Continued)

OTHER PUBLICATIONS

International Search Report and Written Opinion from Internatonal Application No. PCT/US 2006/045447, dated Feb. 22, 2007, 10 pages.

(Continued)

*Primary Examiner* — Marc A Patterson
(74) *Attorney, Agent, or Firm* — Calfee, Halter & Griswold LLP

(57) ABSTRACT

A preformed web and a method of producing dunnage units from the preformed web. The web is an elongate flattened thermoplastic tube having an inflation edge and an opposite edge. The tube includes spaced transverse seals that define sides of pouches. The tube includes lines of perforations that allow adjacent dunnage units to be separated. A starting point of the lines of perforations is spaced apart from the inflation edge.

13 Claims, 10 Drawing Sheets

U.S. PATENT DOCUMENTS

| | | | | |
|---|---|---|---|---|
| 3,808,981 | A | 5/1974 | Shaw | |
| 3,813,845 | A | 6/1974 | Weikert | |
| 3,817,803 | A | 6/1974 | Horsley | |
| 3,837,990 | A | 9/1974 | McConell et al. | |
| 3,837,991 | A | 9/1974 | Evans | |
| 3,855,037 | A | 12/1974 | Imhagen et al. | 156/497 |
| 3,938,298 | A | 2/1976 | Luhman et al. | |
| 3,939,995 | A | 2/1976 | Baxter | |
| 3,941,306 | A | 3/1976 | Weikert | |
| 4,014,154 | A | 3/1977 | Lerner | |
| 4,017,351 | A | 4/1977 | Larson et al. | |
| 4,021,283 | A | 5/1977 | Weikert | |
| 4,040,526 | A | 8/1977 | Baxter et al. | |
| 4,044,693 | A | 8/1977 | Ramsey, Jr. | |
| 4,076,872 | A | 2/1978 | Lewicki et al. | |
| 4,096,306 | A | 6/1978 | Larson | |
| 4,102,364 | A | 7/1978 | Leslie et al. | |
| 4,103,471 | A | 8/1978 | Lowdermilk | |
| 4,146,069 | A | 3/1979 | Angarola et al. | |
| 4,169,002 | A | 9/1979 | Larson | |
| 4,201,029 | A | 5/1980 | Lerner | |
| 4,306,656 | A | 12/1981 | Dahlem | |
| 4,314,865 | A | 2/1982 | Ottaviano | |
| 4,354,004 | A | 10/1982 | Hughes et al. | |
| 4,493,684 | A | 1/1985 | Bolton | |
| 4,518,654 | A | 5/1985 | Eichbauer et al. | |
| 4,545,180 | A | 10/1985 | Chung et al. | |
| 4,564,407 | A | 1/1986 | Tsuruta | |
| 4,576,669 | A | 3/1986 | Caputo | |
| 4,597,244 | A | 7/1986 | Pharo | |
| 4,616,472 | A | 10/1986 | Owensby et al. | |
| 4,619,635 | A | 10/1986 | Ottaviano | |
| 4,631,901 | A | 12/1986 | Chung et al. | |
| 4,676,376 | A | 6/1987 | Kerswetter | |
| 4,787,755 | A * | 11/1988 | Branson | 383/65 |
| 4,793,123 | A | 12/1988 | Pharo | |
| 4,847,126 | A | 7/1989 | Yamashiro et al. | |
| 4,874,093 | A | 10/1989 | Phara | |
| 4,904,092 | A | 2/1990 | Campbell et al. | |
| 4,918,904 | A | 4/1990 | Pharo | |
| 4,922,687 | A | 5/1990 | Chow et al. | |
| 4,931,033 | A | 6/1990 | Leeds | |
| 4,945,714 | A | 8/1990 | Bodolay et al. | |
| 5,041,317 | A | 8/1991 | Greyvenstein | |
| 5,070,675 | A | 12/1991 | Chuan-Shiang | 53/79 |
| 5,094,657 | A | 3/1992 | Dworak et al. | |
| 5,117,608 | A | 6/1992 | Nease et al. | |
| 5,141,494 | A | 8/1992 | Danforth et al. | |
| 5,181,614 | A | 1/1993 | Watts | |
| 5,188,691 | A | 2/1993 | Caputo | |
| 5,203,761 | A | 4/1993 | Reichental et al. | |
| 5,210,993 | A | 5/1993 | van Boxtel | |
| 5,216,868 | A | 6/1993 | Cooper et al. | |
| 5,257,492 | A | 11/1993 | Watts | |
| 5,272,856 | A | 12/1993 | Pharo | |
| 5,289,671 | A | 3/1994 | Lerner | |
| 5,307,969 | A | 5/1994 | Menendez | |
| 5,340,632 | A | 8/1994 | Chappuis | 428/71 |
| 5,351,828 | A | 10/1994 | Becker et al. | |
| 5,383,837 | A | 1/1995 | Watts | |
| 5,394,676 | A | 3/1995 | Lerner | |
| 5,454,642 | A | 10/1995 | DeLuca | |
| 5,468,525 | A | 11/1995 | Watts | |
| 5,470,300 | A | 11/1995 | Terranova | |
| 5,552,003 | A | 9/1996 | Hoover et al. | |
| 5,651,237 | A | 7/1997 | DeLuca | |
| 5,693,163 | A | 12/1997 | Hoover et al. | |
| 5,699,653 | A | 12/1997 | Hartman et al. | 53/455 |
| 5,733,045 | A | 3/1998 | Jostler et al. | 383/37 |
| 5,755,328 | A | 5/1998 | DeLuca | |
| 5,810,200 | A | 9/1998 | Trokhan | |
| 5,824,392 | A | 10/1998 | Gotoh et al. | |
| 3,414,140 | A | 12/1998 | Feldkamp | |
| 5,921,390 | A | 7/1999 | Simhaee | |
| RE36,501 | E | 1/2000 | Hoover et al. | |
| 6,015,047 | A | 1/2000 | Greeland | |
| 6,015,357 | A | 1/2000 | Ricci | |
| RE36,759 | E | 4/2000 | Hoover et al. | |
| 6,116,000 | A | 9/2000 | Perkins et al. | |
| 6,199,349 | B1 | 3/2001 | Lerner | |
| 6,209,286 | B1 * | 4/2001 | Perkins et al. | 53/403 |
| 6,213,167 | B1 | 4/2001 | Greenland | |
| 6,282,716 | B1 | 9/2001 | Patterson et al. | |
| 6,367,975 | B1 | 4/2002 | Cronauer et al. | |
| 6,410,119 | B1 | 6/2002 | DeLuca et al. | |
| 6,460,313 | B1 | 10/2002 | Cooper | |
| 6,488,222 | B1 | 12/2002 | West et al. | |
| 6,499,278 | B2 * | 12/2002 | Cronauer et al. | 53/459 |
| 6,519,916 | B1 | 2/2003 | Brown | |
| 6,527,147 | B2 | 3/2003 | Wehrmann | |
| 6,550,229 | B2 * | 4/2003 | Sperry et al. | 53/568 |
| 6,565,946 | B2 | 5/2003 | Perkins et al. | |
| 6,582,800 | B2 | 6/2003 | Fuss et al. | |
| 6,625,956 | B1 | 9/2003 | Soudan | 53/455 |
| D480,646 | S | 10/2003 | Borchard et al. | |
| D480,971 | S | 10/2003 | DeLuca et al. | |
| 6,635,145 | B2 | 10/2003 | Cooper | 156/441.5 |
| 6,659,150 | B1 | 12/2003 | Perkins et al. | |
| 6,672,037 | B2 | 1/2004 | Wehrmann | |
| D490,711 | S | 6/2004 | DeLuca et al. | |
| 6,751,926 | B1 | 6/2004 | Cooper | |
| 6,761,960 | B2 | 7/2004 | DeLuca et al. | |
| 6,786,022 | B2 * | 9/2004 | Fuss et al. | 53/403 |
| 6,889,739 | B2 | 5/2005 | Lerner et al. | |
| 6,948,296 | B1 | 9/2005 | Lerner et al. | |
| 6,952,910 | B1 | 10/2005 | Lorsch | |
| 6,955,846 | B2 * | 10/2005 | Lerner | 428/166 |
| D512,311 | S | 12/2005 | DeLuca et al. | |
| D513,182 | S | 12/2005 | DeLuca et al. | |
| 7,125,463 | B2 | 10/2006 | Lerner et al. | |
| 7,165,375 | B2 | 1/2007 | O'Dowd | 53/96 |
| 7,223,462 | B2 | 5/2007 | Perkins et al. | |
| 7,533,772 | B2 | 5/2009 | Yoshifusa et al. | |
| 7,550,191 | B2 | 6/2009 | Lerner | |
| D596,031 | S | 7/2009 | Wehrmann | |
| 7,571,584 | B2 | 8/2009 | Lerner et al. | |
| D599,118 | S | 9/2009 | Perkins et al. | |
| D603,705 | S | 11/2009 | Wehrmann | |
| 7,718,028 | B2 | 5/2010 | Lerner | |
| 7,757,459 | B2 | 7/2010 | Wehrmann | |
| 7,767,288 | B2 | 8/2010 | Lerner | |
| 2001/0000719 | A1 | 5/2001 | Lerner | |
| 2001/0013215 | A1 | 8/2001 | Fuss et al. | |
| 2001/0014980 | A1 | 8/2001 | Patterson et al. | |
| 2002/0108697 | A1 | 8/2002 | Perkins et al. | |
| 2002/0155246 | A1 | 10/2002 | Johnson et al. | |
| 2002/0174629 | A1 | 11/2002 | Cronauer et al. | |
| 2004/0265523 | A1 | 12/2004 | Koyanagi et al. | |
| 2005/0266189 | A1 | 12/2005 | Wehrmann | |
| 2006/0042191 | A1 | 3/2006 | Lerner | |
| 2006/0090421 | A1 | 5/2006 | Sperry et al. | 53/403 |
| 2007/0054074 | A1 | 3/2007 | Wehrmann | |
| 2007/0054075 | A1 | 3/2007 | Wehrmann | |
| 2009/0110864 | A1 | 4/2009 | Wehrmann | |

FOREIGN PATENT DOCUMENTS

| | | | |
|---|---|---|---|
| EP | 1 466 720 | A2 | 10/2004 |
| WO | 97/46453 | | 12/1997 |
| WO | WO 00/71423 | A1 | 11/2000 |
| WO | 01/53153 | | 7/2001 |
| WO | WO 01/85434 | A2 | 11/2001 |
| WO | WO 02/26589 | A1 | 4/2002 |
| WO | 2005/118408 | | 12/2005 |
| WO | 2009/058749 | | 5/2009 |

OTHER PUBLICATIONS

International Search Report and Written Opinion from Internatonal Application No. PCT/US 2005/18817, dated Mar. 30, 2007, 6 pages.
Office action from U.S. Appl. No. 11/194,375, mailed Jun. 2, 2008.
Office action from U.S. Appl. No. 11/194,375, mailed Nov. 20, 2007.
Advisory action from U.S. Appl. No. 11/194,375, mailed Oct. 9, 2007.
Office action from U.S. Appl. No. 11/194,375, mailed Aug. 21, 2007.
Office action from U.S. Appl. No. 11/194,375, mailed Feb. 6, 2007.
Office action from U.S. Appl. No. 11/194,375, mailed Nov. 13, 2006.
Amendment from U.S. Appl. No. 11/194,375 dated May 4, 2007.

Amendment from U.S. Appl. No. 11/194,375 dated Oct. 2, 2007.
Amendment from U.S. Appl. No. 11/194,375 dated Feb. 29, 2008.
Amendment from U.S. Appl. No. 11/194,375 dated Aug. 4, 2008.
Advisory Action from U.S. Appl. No. 11/194,375 dated Aug. 12, 2008.
Office action from U.S. Appl. No. 11/194,375 dated Sep. 19, 2008.
Amendment from U.S. Appl. No. 11/194,375 dated Dec. 19, 2008.
Amendment from U.S. Appl. No. 11/141,304 dated Jan. 20, 2009.
Notice of Allowance from U.S. Appl. No. 11/194,375 dated Apr. 10, 2009.
International Search Report and Written Opinion from PCT/US08/81410 dated Mar. 31, 2009.
Office action from U.S. Appl. No. 11/141,304 dated Apr. 28, 2009.
Response from U.S. Appl. No. 11/141,304 dated Jun. 24, 2009.
Office action from U.S. Appl. No. 11/141,304 dated Aug. 7, 2009.
Notice of Allowance from U.S. Appl. No. 29/332,921 dated Aug. 11, 2009.
Office action from U.S. Appl. No. 12/507,220 dated Oct. 22, 2009.
Drawing BRIGGS BAG 1—illustrates a web or pre-formed bags sold by Applicant for use in Applicant's SP machines more than one year prior to the priority date of the present application. Operation of Applicant's SP machines is disclosed by U.S. Patent Nos. 4,969,310; 5,743,070; 5,944,424; 5,722,218; and 6,035,611.
Drawing GOODY BAG 1—illustrates a web or pre-formed bags sold by Applicant for use in Applicant's SP machines more than one year prior to the priority date of the present application. Operation of Applicant's SP machines is disclosed by U.S. Patent Nos. 4,969,310; 5,743,070; 5,944,424; 5,722,218; and 6,035,611.
Office action from U.S. Appl. No. 10/408,946 dated Jun. 7, 2004.
Amendment from U.S. Appl. No. 10/408,946 dated Sep. 23, 2004.
Office action from U.S. Appl. No. 10/408,946 dated Jan. 6, 2005.
Amendment from U.S. Appl. No. 10/408,946 dated Mar. 10, 2005.
Interview Summary from U.S. Appl. No. 10/408,946 dated Mar. 4, 2005.
Notice of Allowance from U.S. Appl. No. 10/408,946 dated Apr. 25, 2005.
Amendment from U.S. Appl. No. 11/141,304 dated Jan. 7, 2010.
Notice of Allowance from U.S. Appl. No. 11/141,304 dated Mar. 31, 2010.
Office action from U.S. Appl. No. 11/252,365 dated Jan. 31, 2008.
Amendment from U.S. Appl. No. 11/252,365 dated Mar. 18, 2008.
Notice of Allowance from U.S. Appl. No. 11/252,365 dated Feb. 27, 2009.
Amendment after Allowance from U.S. Appl. No. 11/252,365 dated Mar. 4, 2009.
Office action from U.S. Appl. No. 11/594,539 dated Apr. 19, 2010.
Office action from U.S. Appl. No. 12/409,026 dated Feb. 4, 2010.
Amendment from U.S. Appl. No. 12/409,026 dated May 3, 2010.
Response to Office action from U.S. Appl. No. 12/507,220 dated Apr. 16, 2010.
Office action from U.S. Appl. No. 11/496,654 dated Jan. 13, 2010.
Notice of Allowance from U.S. Appl. No. 11/496,645 dated Jan. 4, 2010.
Office action from U.S. Appl. No. 11/194,375, mailed Sep. 19, 2008.
Amendment from U.S. Appl. No. 11/496,654 dated Jun. 14, 2010.
Office action from U.S. Appl. No. 12/507,220 dated May 6, 2010.
Office action from U.S. Appl. No. 11/496,654 dated Jun. 28, 2010.
Notice of Allowance from U.S. Appl. No. 12/409,026 dated Jun. 17, 2010.
Response from U.S. Appl. No. 12/507,220 dated Aug. 5, 2010.
Office action from U.S. Appl. No. 12/507,220 dated Aug. 12, 2010.
Office action from U.S. Appl. No. 11/594,540 dated Sep. 3, 2010.
Response from U.S. Appl. No. 11/594,539 dated Jul. 19, 2010.
Notice of Allowance from U.S. Appl. No. 29/346,902 dated Sep. 9, 2010.
Office action from U.S. Appl. No. 11/594,539 dated Sep. 30, 2010.
Office action from U.S. Appl. No. 11/141,304, notification date Nov. 7, 2008.
Notice of Allowance from U.S. Appl. No. 10/408,947 dated Dec. 21, 2004.
Office action from U.S. Appl. No. 11/111,164 dated Apr. 27, 2006.
Response from U.S. Appl. No. 11/111,164 dated Jul. 17, 2006.
Notice of Allowance from U.S. Appl. No. 11/111,164 dated Aug. 23, 2006.
Response from U.S. Appl. No. 11/496,645 dated Nov. 30, 2009.
Office action from U.S. Appl. No. 11/496,654 dated Apr. 1, 2009.
Response from U.S. Appl. No. 11/496,654 dated Jun. 26, 2009.
Office action from U.S. Appl. No. 11/496,654 dated Aug. 11, 2009.
Response from U.S. Appl. No. 11/496,654 dated Dec. 11, 2009.
Office action from U.S. Appl. No. 11/496,645 dated Aug. 31, 2009.
International Search Report and Written Opinion from PCT/US09/38344 dated Dec. 22, 2009.

* cited by examiner

WEB AND METHOD FOR MAKING FLUID FILLED UNITS

RELATED APPLICATIONS

The following United States Patent Applications are incorporated fully herein by reference in their entirety: U.S. patent application Ser. No. 11/194,375, entitled "Web and Method for Making Fluid Filled Units," filed on Aug. 1, 2005, which is a continuation-in-part of U.S. patent application Ser. No. 11/141,304, entitled "Web and Method for Making Fluid Filled Units," filed on May 31, 2005, which claim the benefit of U.S. Provisional Patent Application Ser. No. 60/576,004, entitled "Web for Fluid Filled Unit Formation," filed on Jun. 1, 2004, and 60/592,812, entitled "Air Pouch Machine," filed on Jul. 30, 2004.

FIELD OF THE INVENTION

The present application relates to fluid filled units and more particularly to plastic webs of interconnected pouches and to processes of converting interconnected pouches to fluid filled units.

BACKGROUND

Machines for forming and filling dunnage units from sheets of plastic are known. Machines which produce dunnage units by inflating preformed pouches in a preformed web are also known. For many applications, machines which utilize preformed webs are preferred.

Typically, the entire length of sides of adjacent dunnage units formed from a preformed web are connected by perforations. In prior art webs, these perforations extend all the way to an inflation edge of the web.

SUMMARY

The present invention relates to plastic webs of interconnected pouches and processes of converting interconnected pouches to at least one row of dunnage units. In one embodiment, the web is an elongate flattened thermoplastic tube having an inflation edge and an opposite edge. The tube includes spaced transverse seals that define sides of pouches. The tube includes lines of perforations that allow adjacent dunnage units to be separated. A starting point of the lines of perforations is spaced apart from the inflation edge.

Further advantages and benefits will become apparent to those skilled in the art after considering the following description and appended claims in conjunction with the accompanying drawings.

DETAILED DESCRIPTION

Figure 1:
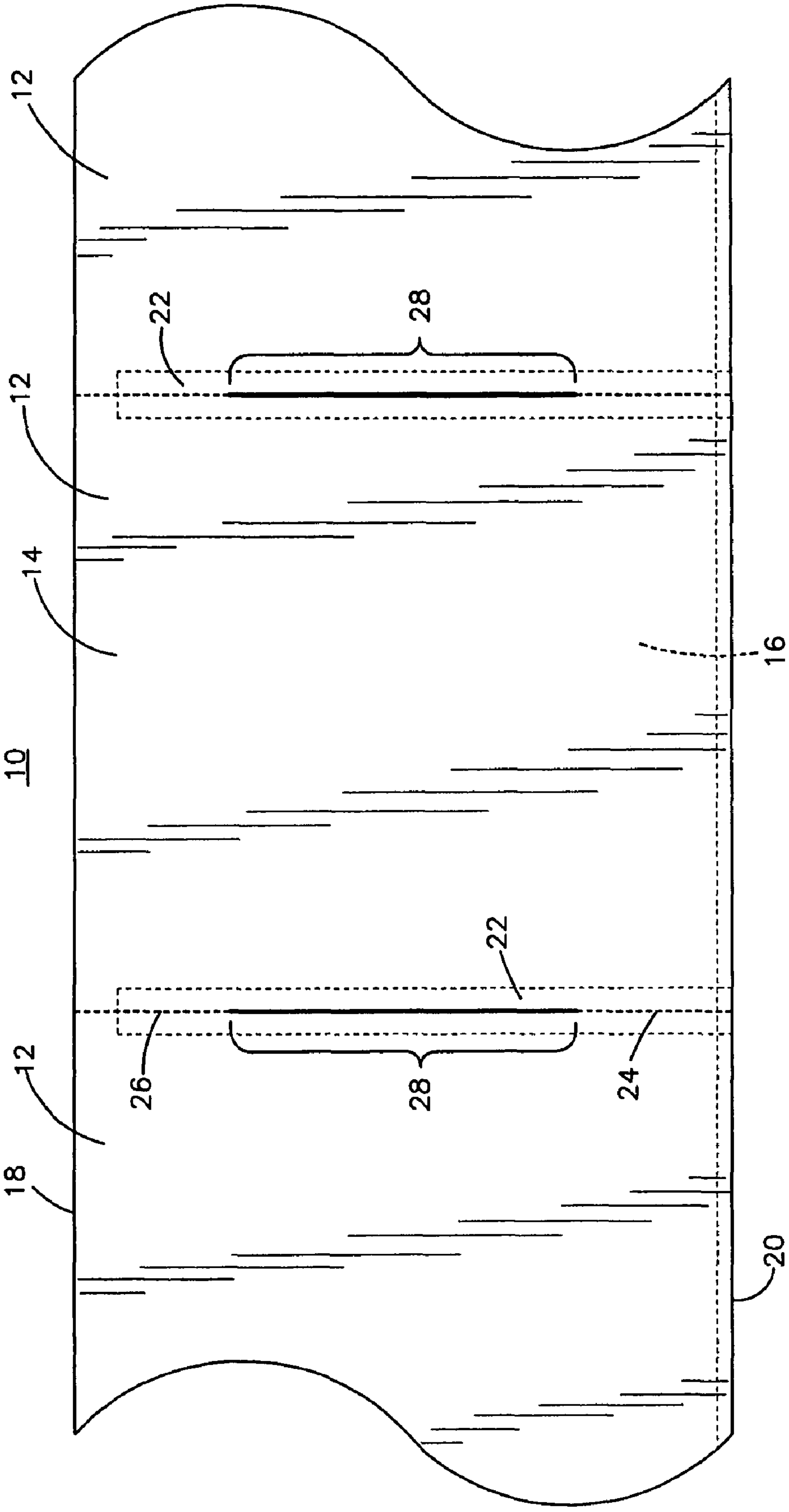
FIG. 1 illustrates a web for making fluid filled units.
Figure 2:
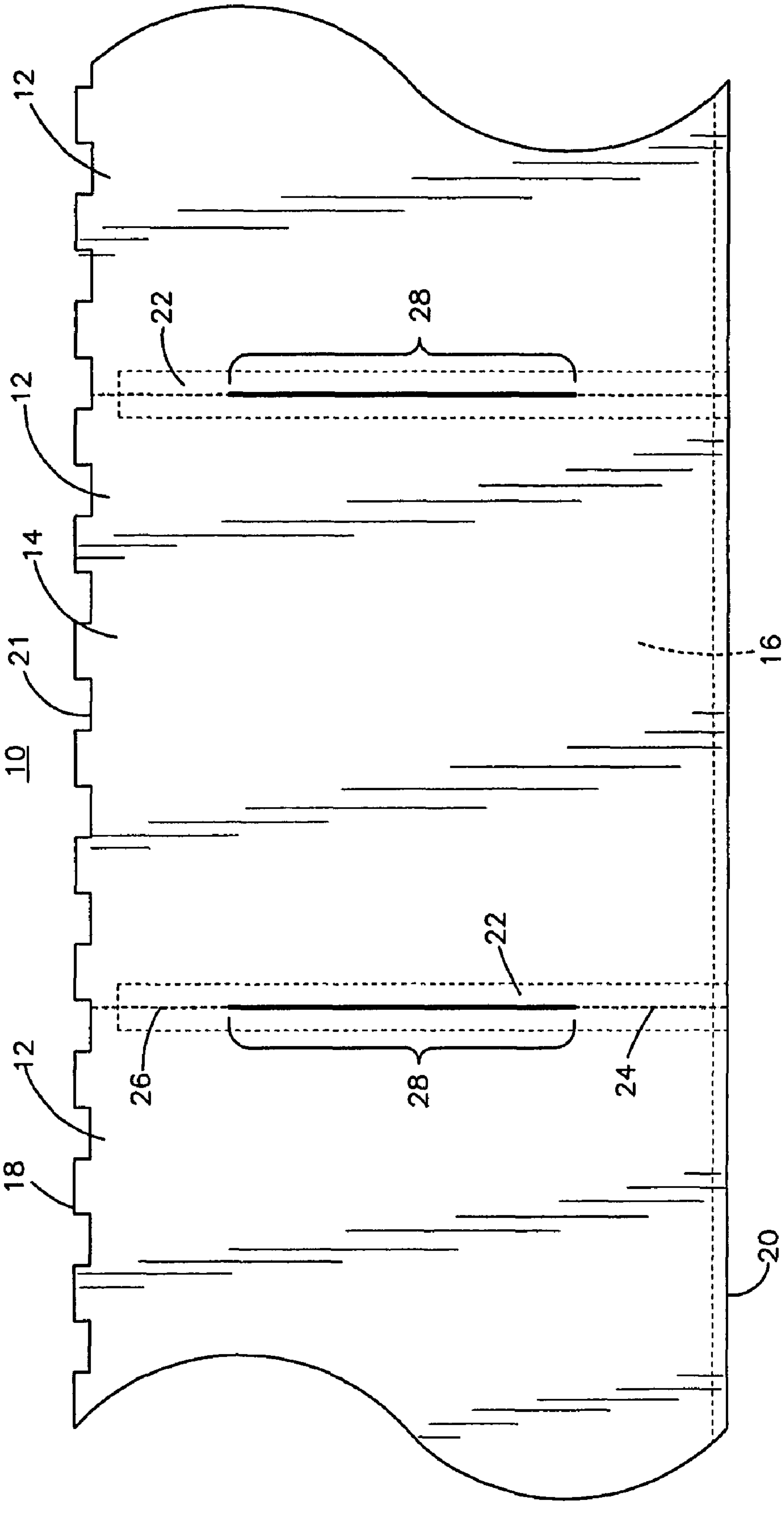
FIG. 2 illustrates a web for making fluid filled units.

Referring to FIGS. 1 and 2, exemplary illustrations of webs 10 of inflatable pouches 12 are shown. The webs 10 includes a top elongated layer of plastic 14 superposed onto a bottom layer of plastic 16. The layers are connected together along spaced edges, referred to as the inflation edge 18 and the opposite edge 20. In the example illustrated by FIG. 1, each edge 18, 20 is either a fold or a seal that connects the superposed layers 14, 16 along the edges 18, 20. The connection at the opposite edge 20 is illustrated as a hermetic seal and the connection at the inflation edge 18 is illustrated as a fold in FIG. 1. However, the fold and the seal could be reversed or both of the connections could be seals in the FIG. 1 embodiment. In the example illustrated by FIG. 2, the inflation edge 18 comprises a frangible connection 21 and the opposite edge 20 is a hermetic seal. The illustrated frangible connection 21 is a line of perforations. The size of the perforations is exaggerated to clarify FIG. 2. The frangible connection 21 may be formed by folding the inflation edge 18 and pulling the inflation edge over a serration forming wheel (not shown).

Referring to FIGS. 1 and 2, a plurality of longitudinally spaced, transverse seals 22 join the top and bottom layers 14, 16. Generally, each transverse seal 22 extends from the opposite edge 20 to within a short distance of the inflation edge 18. Spaced pairs of lines of perforations 24, 26 extend through the top and bottom layers terminating a short distance from the edges 18, 20 respectively. A gap forming area 28 extends between each associated pair of lines of perforations 24, 26. The gap forming area 28 opens to form a gap 13 when the pouches are inflated (see FIG. 3).

A gap forming area 28 denotes an area, preferably linear in shape, that will rupture or otherwise separate when exposed to a predetermined inflation force. The magnitude of the inflation force is less than the magnitude of the force needed to rupture or separate the spaced apart lines of perforations 24, 26. The gap forming area 28 can take on a number of embodiments, as will be discussed below. Any method that produces an area between the spaced apart lines of perforations 24, 26 that ruptures or otherwise separates at a force lower than a force needed to rupture or separate spaced lines of perforations 24, 26 may be employed to make the gap forming area 28.

Figure 3:
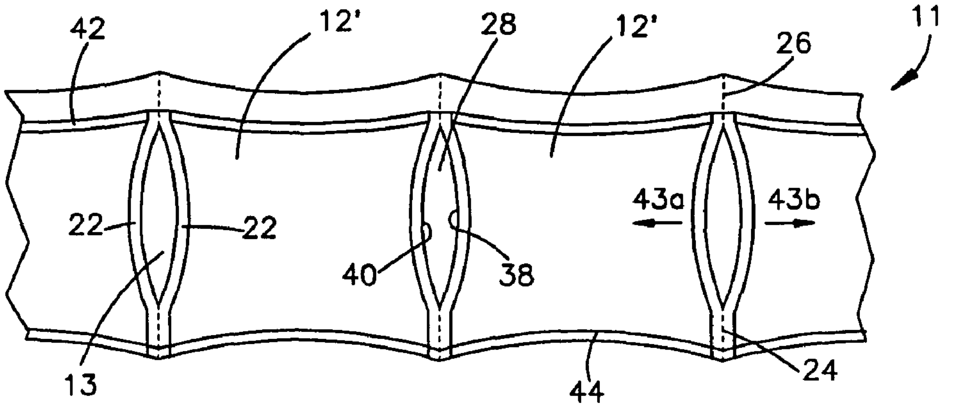
FIG. 3 illustrates a web with pouches inflated and sealed to form fluid filled units.

Referring to FIG. 3, the web 10 of pouches 12 (FIGS. 1 and 2) is inflated and sealed to form a row 11 of dunnage units 12'. The formed dunnage units 12' are configured to be much easier to separate from one another than prior art arrays of dunnage units. In the exemplary embodiment of FIG. 3, each adjacent pair of dunnage units 12' is connected together by a pair of spaced apart lines of perforations 24, 26. The spaced apart lines of perforations 24, 26 are spaced apart by a gap 13. A single row 11 of dunnage units 12' can be graphically described as being in a "ladder" configuration. This configuration makes separating two adjacent dunnage units 12' much easier than separating prior art arrays of dunnage units. To separate a pair of adjacent dunnage units 12, a worker simply inserts an object or objects, such as a hand or hands, into the gap 13 and pulls one dunnage unit 12' away from the other dunnage unit 12'. In the alternative, a mechanical system can be used to separate dunnage units 12'. A machine can be configured to insert an object between adjacent dunnage units 12' and apply a force to separate the units Referring to FIGS. 1-3, prior to conversion to a dunnage unit, a pouch is typically hermetically sealed on three sides, leaving one side open to allow for inflation. Once the pouch is inflated, the inflation opening is hermetically sealed and the dunnage unit is formed. During the inflation process, as the volume of the pouch increases the sides of the pouch have a tendency to draw inward. Drawing the sides of the pouches inward will shorten the length of the sides of the pouch unless the sides of the pouch are constrained. In this application, the term foreshortening refers to the tendency of the length of a pouch side to shorten as the pouch is inflated. In prior art webs, the sides of the pouch are restrained, because sides of adjacent pouches are connected by lines of perforations that extend along the entire length of the pouches and remain intact during and after inflation. The foreshortening of the unrestrained sides, such as the inflation opening, may not be uniform. Restraining the sides of adjacent connected pouches can cause undesirable inflation induced stresses. These undesirable stresses caused because sides of adjacent pouches are connected and restrained, thus, limiting inflation and causing wrinkles to develop in the layers at the unrestrained inflation opening. The wrinkles can extend into a section of the inflation opening to be sealed to complete the dunnage unit, which may comprise the seal. One reason the seal can be compromised is that wrinkling can cause sections of the layers 14, 16 to fold on top of one another. A sealing station of a dunnage machine is typically set to apply the appropriate amount of heat to seal two layers of material. The sealing of multiple layers of material in the area of a wrinkle results in a seal that is weaker than remaining seal areas and may result in a small leak or tendency to rupture at loads lower than loads at which the dunnage units is designed to rupture.

In the embodiment illustrated by FIG. 3, the gap forming area 28, produces a gap 13 between adjacent pouches upon inflation. The gap allows foreshortening of the connected pouch sides and thereby reduces the undesirable stresses that are introduced during inflation as compared with prior art webs. In addition, the web with a gap 13 facilitates fuller inflation of each pouch. The gap 13 maintains the inflation opening substantially free of wrinkles as the inflation opening is sealed to convert the inflated pouches to a dunnage units.

The illustrated web 10 is constructed from a heat sealable plastic film, such as polyethylene. The web 10 is designed to accommodate a process for inflating each pouch 12 in the web to create a row or ladder 11 of dunnage units 12'. The gap forming area 28 creates a gap 13 between dunnage units 12', which facilitate a efficient and effective process for separating adjacent dunnage units 12' in the row or ladder 11.

Figure 4:
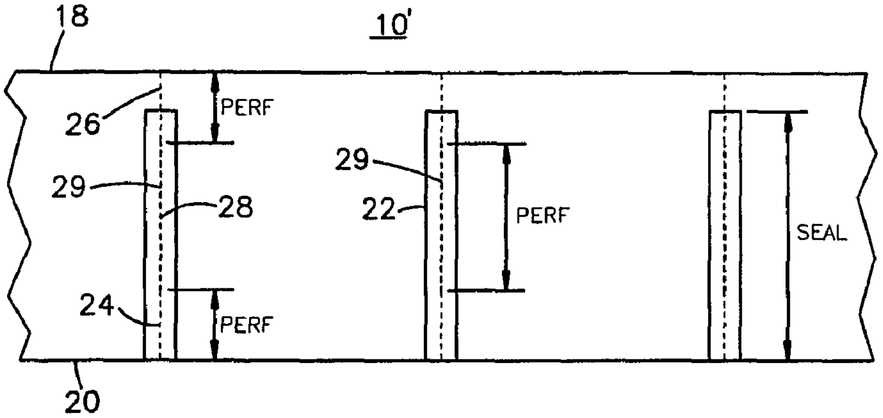
FIG. 4 illustrates a web for making fluid filled units.

In the example illustrated by FIG. 4, the gap forming area 28 defined by the web 10' includes an easily breakable line of perforations 29 between the spaced lines of perforations 24, 26. The force needed to rupture or separate the line of perforations 29 is less than the force needed to separate the perforations 24, 26 extending inward of the web edges 18, 20. Each pair of perforations 24, 26 and associated more easily breakable line of perforations 29 divide the transverse seal 22 into two transverse sections. As a pouch 12 is inflated, the line of perforation 29 begins to rupture or separate leading to the development of a gap 13 between the produced dunnage units 12' (See FIG. 3). Once the pouch 12 is fully inflated, the line of perforations 29 is fully or nearly fully ruptured; however the perforations 24, 26 at the edges remain intact. These perforations 24, 26 are ruptured or separated when a worker or automated process mechanically separates the perforations 24, 26.

Figure 5:
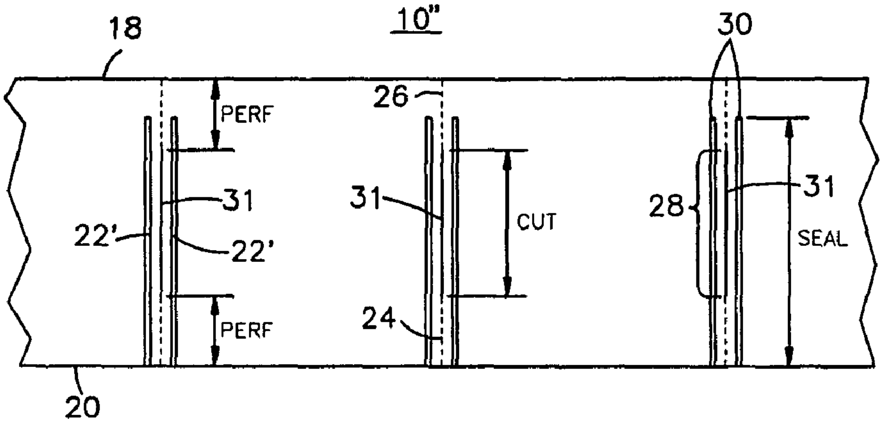
FIG. 5 illustrates a web for making fluid filled units.

FIG. 5 illustrates another embodiment of the web 10''. In this embodiment the gap forming area 28 comprises an elongated cut 31 through both layers of material 14, 16. The cut 31 extends between each associated pair of lines of perforations 24, 26. In the embodiment illustrated by FIG. 5, pairs 30 of transverse seals 22' extend from the opposite edge 20 to within a short distance of the inflation edge 18. Each of the pairs of lines of perforations 24, 26 and corresponding cuts 31 are between an associated pair of transverse seals 30. It should be readily apparent that the seal 22 shown in FIG. 4 could be used with the cut 31 shown in FIG. 5. It should also be readily apparent that the line of perforations shown in FIG. 4 could be used with the transverse seals 22' shown in FIG. 5. It should be additionally apparent that any gap forming area 28 can be used with either of the transverse seal configurations 22, 22' shown in FIGS. 4 and 5.

Figure 6:
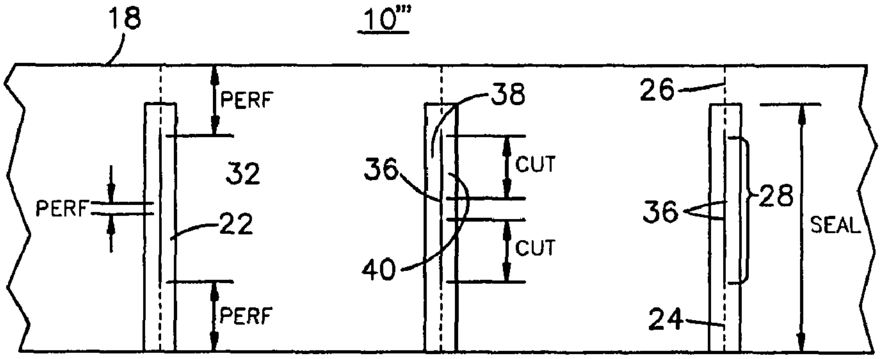
FIG. 6 illustrates a web for making fluid filled units.
Figure 7A:
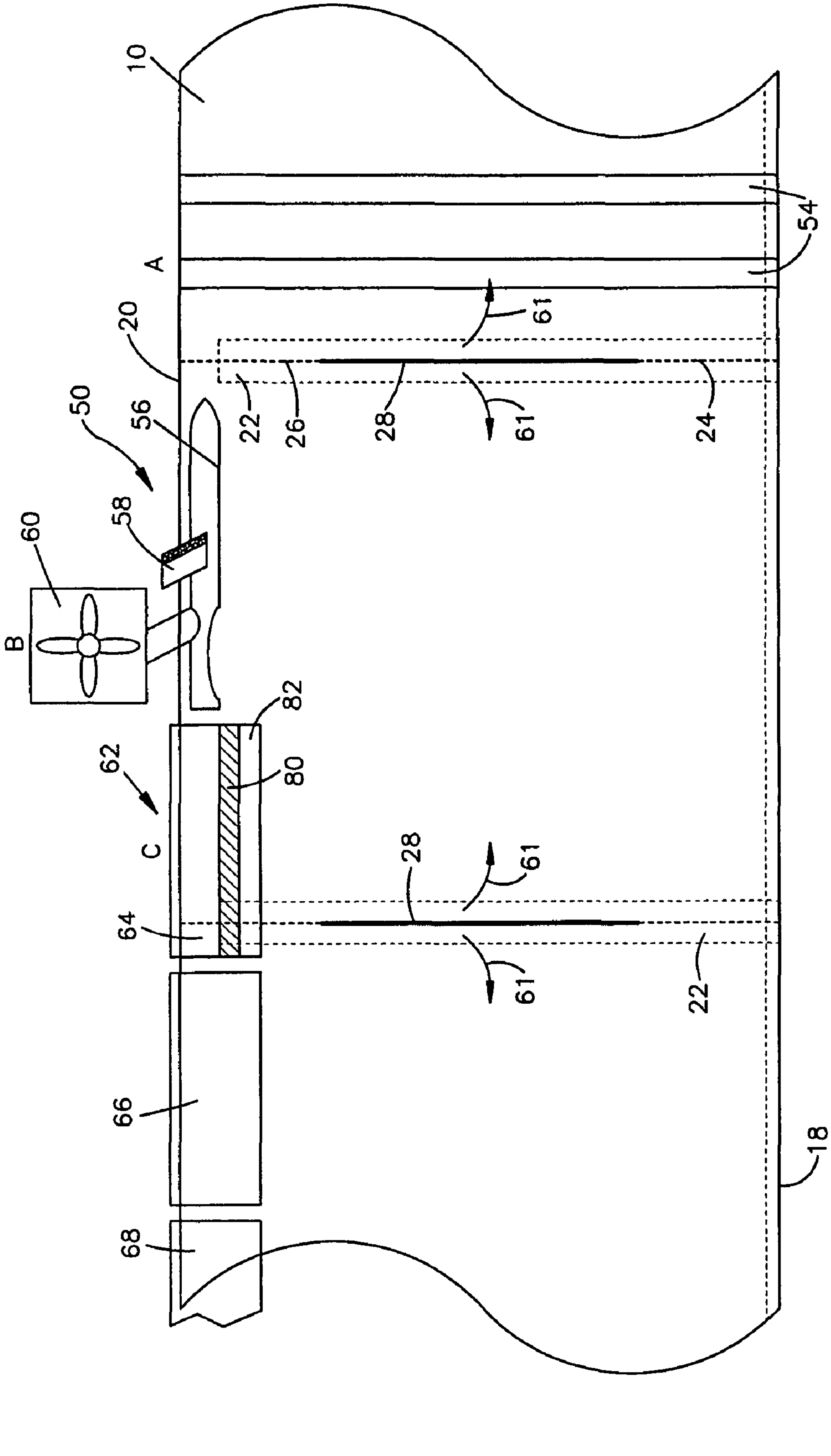
FIG. 7A schematically illustrates a plan view of a process and machine for converting web pouches to fluid filled units.
Figure 7B:
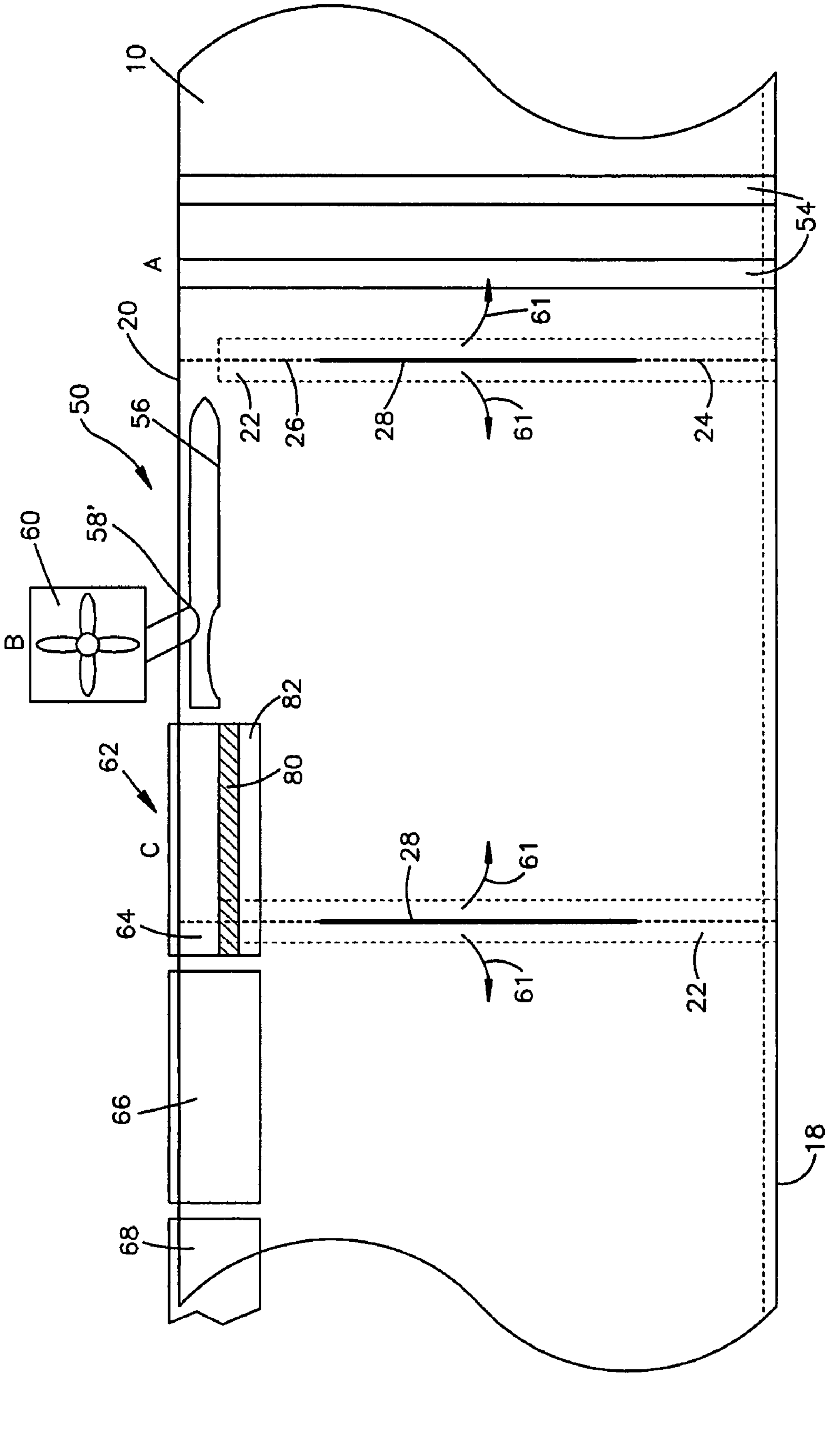
FIG. 7B schematically illustrates a plan view of a process and machine for converting web pouches to fluid filled units.

FIG. 6 illustrates a further embodiment of the web 10'''. In this embodiment, the gap forming area 28 comprises at least two elongated cuts 32, separated by light connections of plastic 36, also referred to as “ticks.” These connections 36 hold transverse edges 38, 40 of the pouches 12 together to ease handling of the web 10, such as handling required during installation of the web 10 into a dunnage machine. As the pouches 12 are inflated, the connections 36 rupture or otherwise break resulting in a gap 13 between the spaced pairs of perforations 24, 26. This gap 13 allows for full inflation and reduces the stresses in the layers at the seal site normally caused by the foreshortening and restrictions on foreshortening of webs in the prior art. The reduced stress in the layers inhibits wrinkles along the inflation opening to be sealed.

Other methods of creating a gap forming area not specifically disclosed are with the scope of the present application. Any area that separates and forms a gap between adjacent pouches as pouches 12 in a web 10 are inflated are contemplated by this disclosure.

FIG. 3, illustrates a length of the web 10, 10', 10'' or 10''' after it has been inflated and sealed to form dunnage units 12'. An inflation seal 42, the transverse seals 22 and an opposite edge seal 44 hermetically seal the top and bottom layers. The side edges 38, 40 of the formed dunnage units are separated to form a gap 13. Each pair of adjacent dunnage units 12' are connected together by the pair of spaced apart lines of perforations 24, 26. The gap 13 extends between the pair of spaced apart lines of perforations 24, 26. The array of dunnage units 12' is a single row of dunnage units in a “ladder” configuration. The lines of perforations 24, 26 are configured to be easily breakable by a worker or automated system. To separate a pair of adjacent units 12', a worker inserts an object, such as the worker’s hand or hands into the gap 13. The worker then grasps one or both of the adjacent dunnage units 12' and pulls the adjacent dunnage units 12' relatively apart as indicated by arrows **43*a*, 43*b*. The lines of perforation 24, 26 rupture or otherwise separate and the two adjacent dunnage units 12' are separated. The existence of the gap 13 also results in reduced stresses in the area of the inflation seal 42 at the time of sealing and accommodates increased inflation volume of the dunnage units 12'** as compared with prior inflated dunnage units.

In one embodiment, the line of perforations 24 that extends from the opposite edge 20 is omitted. In this embodiment, the gap forming area 28 extends from the inflation edge line of perforations 26 to the opposite edge. In this embodiment, the gap 13 extends from the inflation edge line of perforations 26 to the opposite edge 20.

The connection of the layers 14, 16 at the inflation edge 18 can be any connection that is maintained between layers 14, 16 prior to the web 10 being processed to create dunnage units 12'. In the embodiment illustrated by FIG. 1, the connection is a fold. In the embodiment illustrated by FIG. 2, the connection is a line of perforations 21. One method of producing such a web is to fold a continuous layer of plastic onto itself and create a fold at what is to become the inflation edge 18, A tool can be placed in contact with the fold to create a line of perforation. The opposite edge 20 can be hermetically sealed and the transverse hermetic seals 22 can be added along with the separated lines of perforations 24, 26 extending inward from the inflation and opposite edges 18, 20. The web shown in FIG. 1 can be produced in the same manner, except the perforations are not added.

FIGS. 7A, 7B, 8A, 8B and 9 schematically illustrate a machine 50 and process of converting the webs 10, 10', 10" and 10'" to dunnage units 12'. Referring to FIGS. 7A, 7B, 8A and 8B, a web 10, 10', 10" or 10'" is routed from a supply 52 (FIGS. 8A and 8B) to and around a pair of elongated, transversely extending guide rollers 54. The guide rollers 54 keep the web taught as the web 10 is pulled through the machine 50. At location A, the web pouches are uninflated. In the embodiment illustrated by FIG. 5, pouch edges 38, 40 defined by the cut 31 are close to one another at location A. In the embodiments illustrated by FIGS. 4 and 6, the frangible connections 29, 36 are of sufficient strength to remain intact at location A.

A longitudinally extending guide pin 56 is disposed in the web at station B. The guide pin 56 is disposed in a pocket bounded by the top and bottom layers 14, 16, the inflation edge 18, and ends of the transverse seals 22. The guide pin 56 aligns the web as it is pulled through the machine. In the embodiment illustrated by FIGS. 7A and 8A, a knife cutter 58 extends from the guide pin 56. The knife cutter 58 is used to cut the inflation edge 18 illustrated by FIG. 1, but could also be used to cut the perforated inflation edge 18 illustrated by FIG. 2. The cutter 58 slits the inflation edge 18 as the web moves through the machine 50 to provide inflation openings 59 (See FIG. 9) into the pouches, while leaving the pouches otherwise imperforate. A variation of this would have the cutter 58 cutting either layer 14, 16, or both near the inflation edge 18. In the embodiment illustrated by FIGS. 7B and 8B, the guide pin 56 defines a blunt surface 58' and the knife cutter is omitted. The blunt surface 58' is used to break the perforated inflation edge illustrated by FIG. 2. The blunt surface 58' breaks open the inflation edge 18 as the web moves through the machine to provide the inflation openings into the pouches 12.

Figure 9:
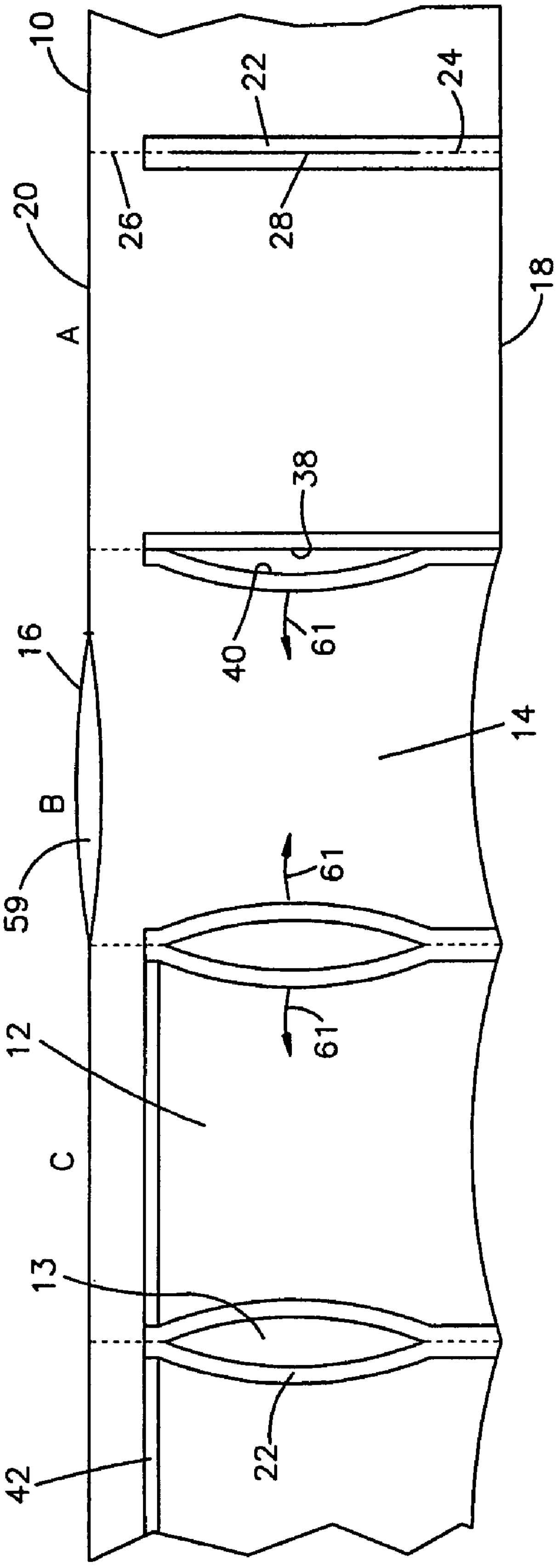
FIG. 9 illustrates a process for converting web pouches to fluid filled units.

A blower 60 is positioned after the cutter 58 or blunt surface 58' in station B. The blower 60 inflates the web pouches as the web moves past the blower. Referring to FIG. 9, the web pouches are opened and inflated at station B. The seal edges 38, 40 spread apart as indicated by arrows 61 (FIGS. 7A, 7B and 9) as the web pouches are inflated. In the embodiment illustrated by FIGS. 4 and 6, the frangible connections 29, 36 maintain successive pouches substantially aligned as the web is fed to the filling station B. The frangible connections are sufficiently weak that the connection between a pouch that has been opened for inflation and is being inflated at the fill station B and an adjacent, successive (or preceding) pouch will rupture as the pouch at the fill station is inflated. The spreading of the edges 38, 40 forms a row of inflated dunnage units in a ladder configuration and increases the volume of the air that can enter the pouches. The spreading also reduces the stresses imparted to the web adjacent the inflation side edge 18 where it is to be sealed.

Figure 8A:
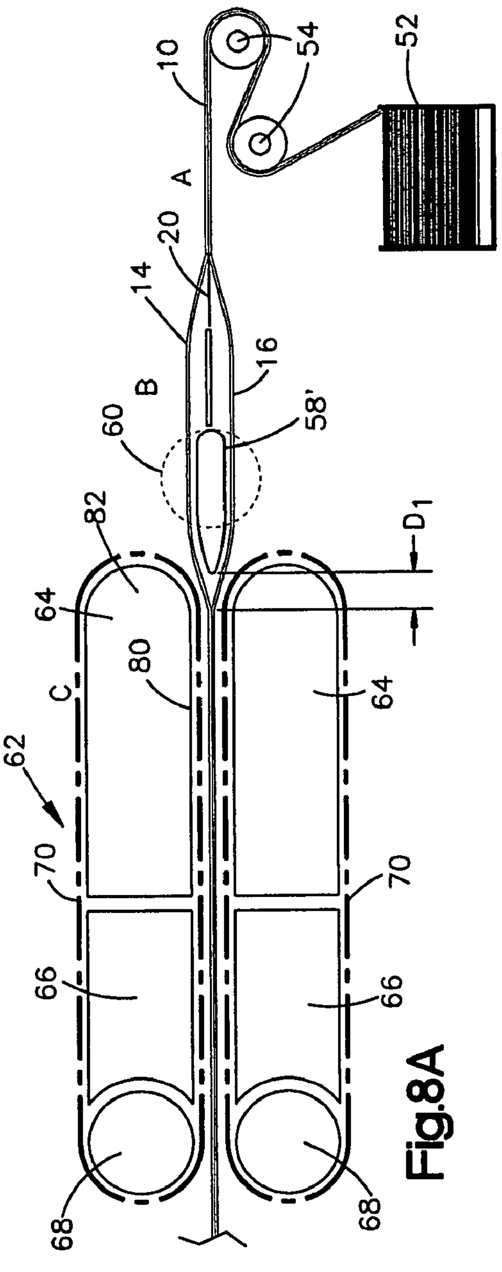
FIG. 8A schematically illustrates an elevational view of the process and machine for converting web pouches to fluid filled units.
Figure 8B:
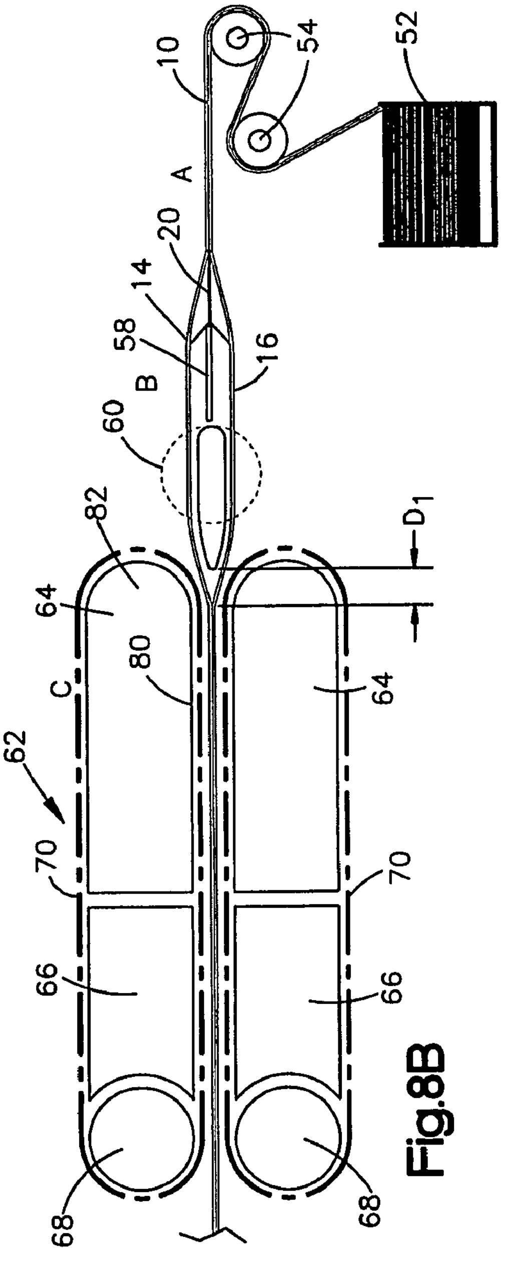
FIG. 8B schematically illustrates a an elevational view of the process and machine for converting web pouches to fluid filled units.

The inflation seal 42 is formed at station C by a sealing assembly 62 to complete each dunnage unit. In the exemplary embodiment, the inflated volume of the pouches is maintained by continuing to blow air into the pouch until substantially the entire length of the inflation opening 59 is sealed. In the example of FIGS. 8A, 8B and 9, the blower 60 blows air into a pouch being sealed up to a location that is a short distance $D_1$ from closing position where the sealing assembly 62 pinches the top and bottom layers 14, 16 to maintain the inflated volume of the pouches. This distance $D_1$ is minimized to minimize the volume of air that escapes from the inflated pouch before the trailing transverse seal of the inflated pouch reaches the closing position. For example, the distance $D_1$ may be 0.250 inches or less, to blow air into the inflation opening unit the trailing transverse seal is within 0.250 inches of the closing position.

In the examples illustrated by FIGS. 8A and 8B, the sealing assembly includes a pair of heated sealing elements 64, a pair of cooling elements 66, a pair of drive rollers 68, and a pair of drive belts 70. In an alternate embodiment, the pair of cooling elements is omitted. Each belt 70 is disposed around its respective heat sealing element 64, cooling element 66 (if included), and drive roller 68. Each belt 70 is driven by its respective drive roller 68. The belts 70 are in close proximity or engage one another, such that the belts 70 pull the web 10 through the heat sealing elements 64 and the cooling elements 66. The seal 42 is formed as the web 10 passes through first the heated sealing elements 64 and then a heat sink such as the cooling elements. One suitable heating element 64 includes heating wire 80 carried by an insulating block 82. Resistance of the heating wire 80 causes the heating wire 80 to heat up when voltage is applied. The cooling elements 66 cool the seal 42 as the web 10 is pulled between the cooling elements. One suitable cooling element is an aluminum (or other heat-sink material) block that transfers heat away from the seal 42. Referring to FIG. 9, the spreading of the edges 38, 40 greatly reduces the stress imparted on the web material at or near the seal 42. As a result, a much more reliable seal 42 is formed.

Figure 10:
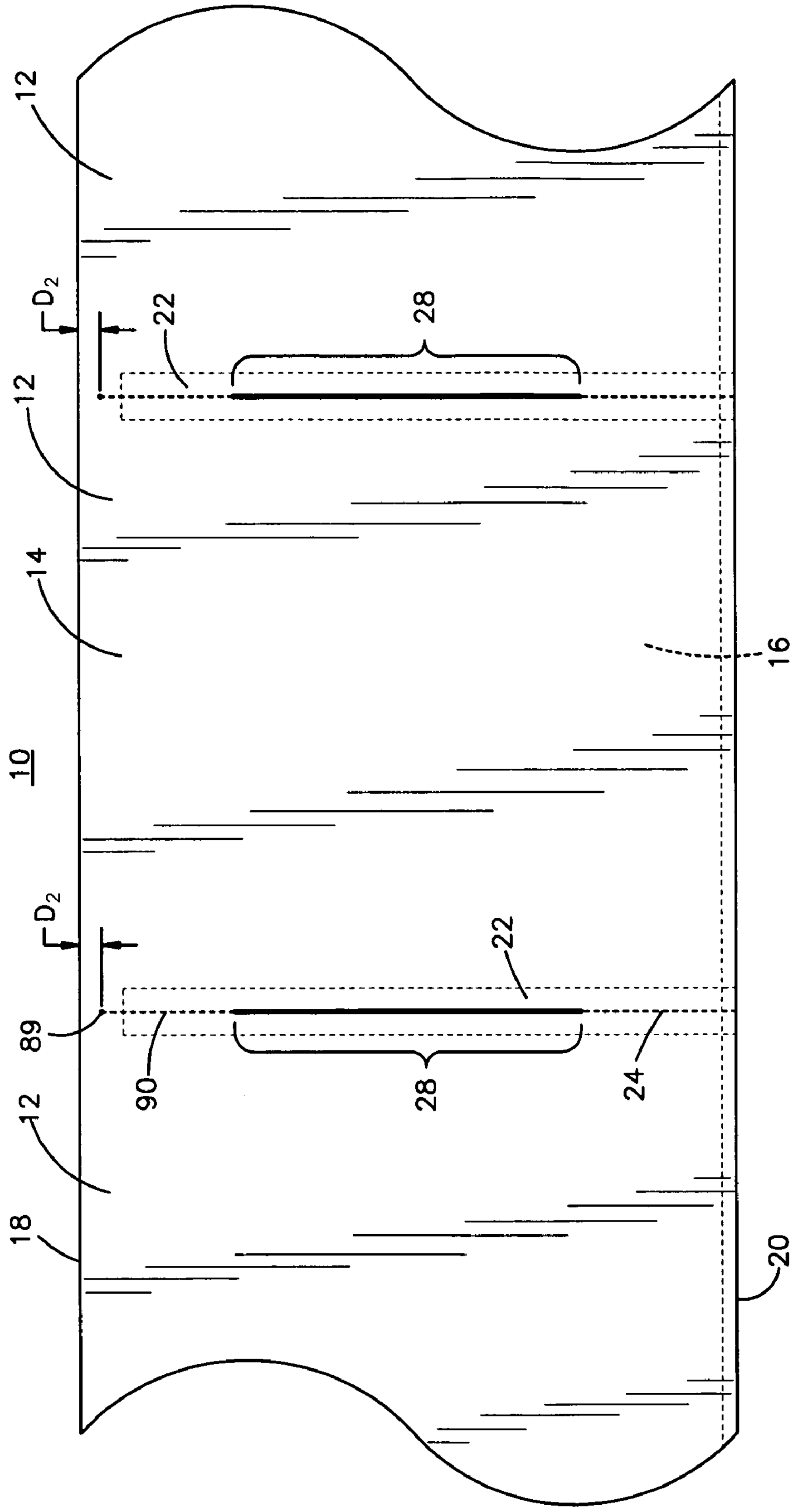
FIG. 10 illustrates a web for making fluid filled units.
Figure 11:
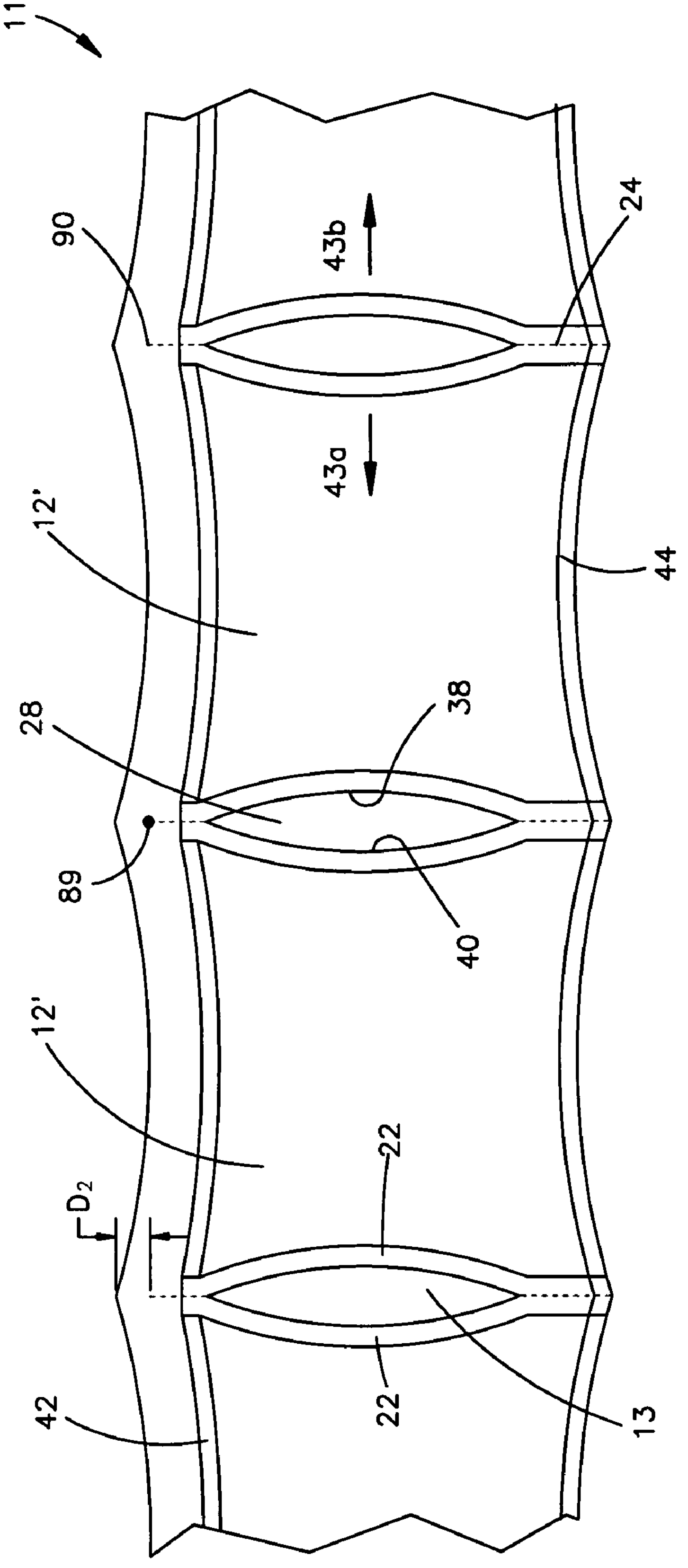
FIG. 11 illustrates a web of pouches inflated and sealed to form fluid filled units.
Figure 12:
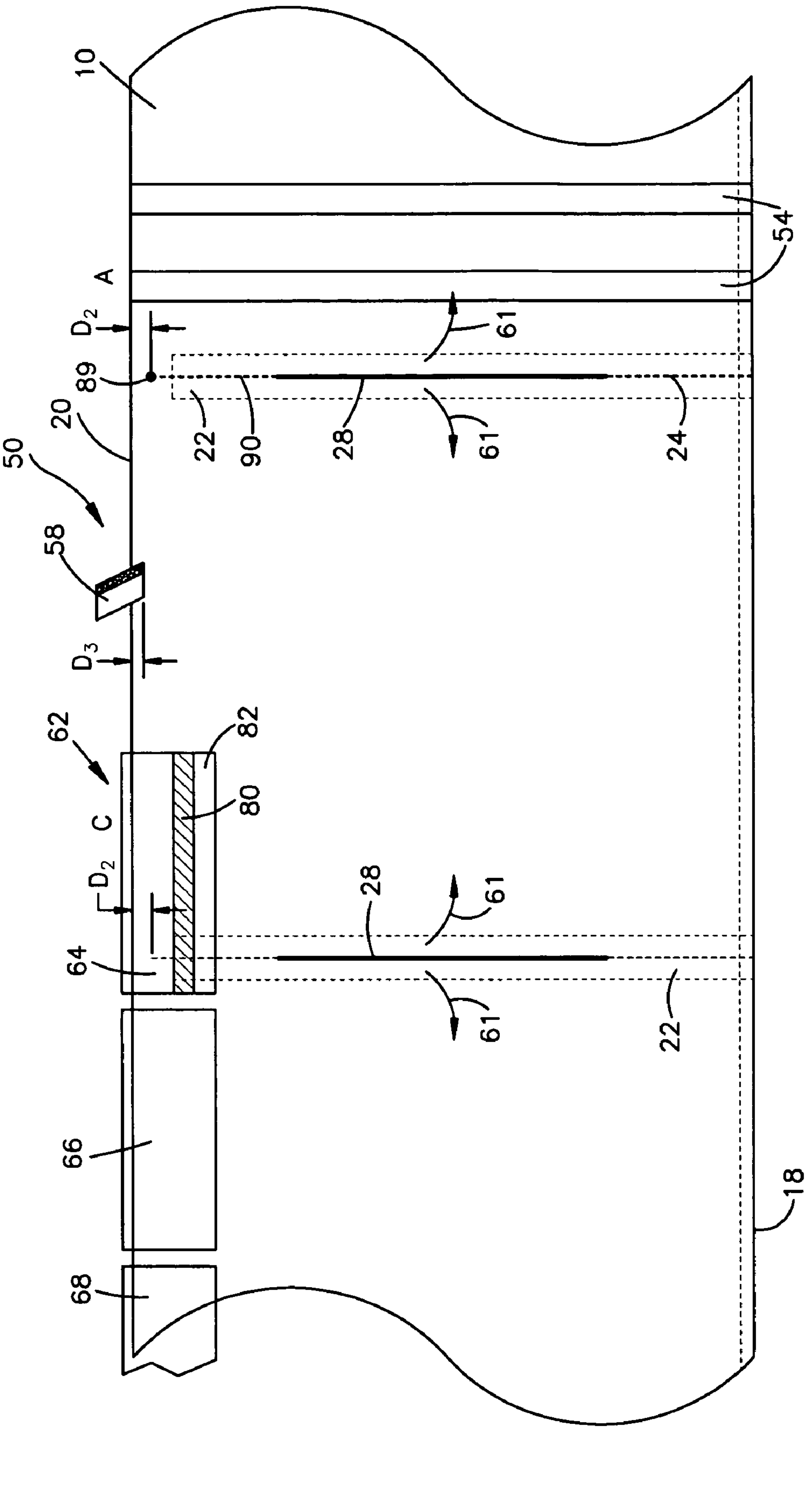
FIG. 12 schematically illustrates a plan view of a cutter for opening the inflation edge of a web.

FIGS. 10-12 show another embodiment of a web 10. In this embodiment, the spaced apart lines of perforations 26 extending from the inflation edge, as shown in FIGS. 1-7B and 9, is replaced with a modified line of perforations 90. As best seen in FIG. 10, a starting point 89 of the line of perforations 90 begins a distance $D_2$ from the inflation edge 18 and extends away from and generally perpendicular to the inflation edge 18. In the example illustrated by FIGS. 10-12, the line of perforations 90 extends to a gap forming area 28 and an opposite edge line of perforations 24 extends to the opposite edge. In another embodiment, the gap forming area 28 is not included and the line of perforations 90 extends all the way or nearly all the way to the opposite edge.

The distance $D_2$ is selected to prevent the cutter (FIG. 12) from engaging the line of perforations in the exemplary embodiment. Although distance $D_2$ may vary based on the particular cutter implemented, in one embodiment, distance $D_2$ is approximately 0.25 to 0.375 inch in length. FIG. 11 illustrates a row of inflated dunnage units. The elimination of perforations extending to the inflation edge 18 does not make it substantially harder to separate adjacent dunnage units in the row 11 of dunnage units 12' in the exemplary embodiment. The dunnage units 12' can still be separated by inserting an object or objects, such as a hand or hands, into the gap 13 and pulling one dunnage unit 12' away from an adjacent dunnage unit 12'. When the dunnage units are pulled apart, the thin web of material between the starting point 89 and the inflation edge easily breaks.

The process of forming perforations through the top and bottom layers of plastic 14, 16, as the web 10 is formed, may cause the top and bottom layers 14, 16 to be adhere or be held together at the line of a perforations. When the lines of perforations extend all the way to the inflation edge and the cutter 58 cuts on one side of the inflation edge, the cutter will engage each line of perforations. Engagement of the lines of perforations by the cutter may cause the web to bind, wrinkle, bunch up, or gather around the edge of the cutter until the cutter passes the line of perforations and begins cutting the web again. In the embodiment illustrated by FIGS. 10-12, engagement of the line of perforations 90 with the cutter is eliminated by beginning the line of perforations 90 a distance $D_2$ away from the inflation edge 20. As illustrated in FIG. 12, the tip of a cutter 58 utilized in opening the inflation edge 20 is positioned a distance $D_3$ past the inflation edge 20 as the edge is opened. The distance $D_2$ that the line of perforations 90 is away from the inflation edge 20 is configured to be greater that the distance $D_3$ to which the tip of a cutter 58 is positioned past the inflation edge 20. As a result, the cutter 58 will not engage the lines of perforations. This eliminates the possibility that the cutter could engage the lines of perforations and cause the web to bunch up or gather around the cutter 58 as the cutter 58 opens the inflation edge.

The present invention is not to be considered limited to the precise construction disclosed. Various modifications, adaptations and uses may occur to those skilled in the art to which the invention relates. All such modifications, adaptations, and uses fall within the scope or spirit of the claims.

The invention claimed is:

1. A web for forming dunnage units, comprising:
- a first elongated layer;
- a second elongated layer superposed over the first elongated layer, the first and second layers connected together at an inflation edge and an opposite edge;
- a plurality of seals, each of said seals extending from the opposite edge to a seal end that is a first distance from the inflation edge, such that pockets are bounded by the first elongated layer, the second elongated layer, the inflation edge, and the seal ends, and wherein said opposite edge and said seals form a plurality of inflatable pouches;
- a first plurality of lines of perforations through the first and second elongated layers, wherein each line of said first plurality of lines of perforations has a starting point in one of said pockets between the inflation edge and the seal ends and each of said lines of said first plurality of lines of perforations extends toward the opposite edge, wherein the starting points are positioned at a second distance from the inflation edge that is greater than a distance between successive perforations in the first plurality of lines of perforations, and wherein said second distance is less than said first distance;
- a second plurality of lines of perforations through the first and second elongated layers that are aligned with and extend toward the first plurality of lines of perforations from said opposite edge;
- a plurality of gap forming lines that extend from the first plurality of lines of perforations to the second plurality of lines of perforations, wherein the gap forming lines are configured such that a force required to spread the gap forming lines apart is less than a force required to break the lines of the first plurality of lines of perforations apart and said force required to spread the gap forming lines apart is less than a force required to break the lines of the second plurality of lines of perforations apart.

2. The web of claim 1 wherein the starting points of the lines of the first plurality of lines of perforations is between 0.250 and 0.375 inches from the inflation edge.

3. The web of claim 1 wherein the second distance is selected such that each line of the first plurality of lines of perforations clears a cutter that cuts the inflation edge to open the pouches for inflation.

4. The web of claim 1 wherein the second distance is selected such that web between the starting point and the inflation edge breaks upon pulling adjacent dunnage units apart.

5. The web of claim 1 wherein said gap forming lines are configured such that said web separates along the gap forming lines when the pouches are inflated.

6. The web of claim 1 wherein the gap forming lines comprise at least one cut through the first and second layers.

7. The web of claim 6 further comprising a tick disposed between at least two cuts, wherein the tick is configured to hold edges of adjacent inflatable pouches together until inflation of the dunnage units.

8. The web of claim 1 wherein the gap forming lines comprises a line of perforations.

9. The web of claim 1 wherein the second distance is selected such that the first plurality of lines of perforations clears a blunt surface that separates the first and second elongated layers proximate the inflation edge to open the pouches for inflation.

10. A web for forming dunnage units, comprising:
- a first elongated layer;
- a second elongated layer superposed over the first elongated layer, the first and second layers connected together at an inflation edge and an opposite edge;
- a plurality of seals, each of said seals extending from the opposite edge to a seal end that is a first distance from the inflation edge, such that pockets are bounded by the first elongated layer, the second elongated layer, the inflation edge, and the seal ends, and wherein said opposite edge and said seals form a plurality of inflatable pouches;
- a first plurality of lines of perforations through the first and second elongated layers, wherein each line of said first plurality of lines of perforations has a starting point in one of said pockets between the inflation edge and the seal ends and each line of said first plurality of lines of perforations extends toward the opposite edge, wherein the starting points are positioned at a second distance that is less than said first distance;
- a second plurality of lines of perforations, each line of the second plurality of lines of perforations through the first and second elongated layers and extending toward the first plurality of lines of perforations;
- a plurality of gap forming lines extending between a termination of the first plurality of lines of perforations and a termination of the second plurality of lines of perforations, wherein the gap forming lines are configured such that a force required to spread the gap forming lines apart is less than a force required to break the lines of the first plurality of lines of perforations apart and said force required to spread the gap forming lines apart is less than a force required to break the lines of the second plurality of lines of perforations apart and wherein inflation of the pouches causes the gap forming lines to spread apart while not causing the lines of the first plurality of lines of perforations or the lines of the second plurality of lines of perforations to break apart.

11. The web of claim 10 wherein the gap forming lines comprise at least two cuts through the first and second layers, the cut being defined by an elongated slit between adjacent pouches in which edges of adjacent pouches are separated.

12. The web of claim 11 wherein the gap forming line comprises a tick of material of the first and second elongated layers disposed between said at least two cuts, wherein the tick holds edges of adjacent inflatable pouches together until inflation of the dunnage units.

13. The web of claim 10 wherein the gap forming lines comprise a line of perforations.

* * * * *